United States Patent [19]  [11] 4,088,121
Lapeyre  [45] May 9, 1978

[54] SOLAR ENERGY CONCENTRATOR
[75] Inventor: James M. Lapeyre, New Orleans, La.
[73] Assignee: The Laitram Corporation, New Orleans, La.
[21] Appl. No.: 760,558
[22] Filed: Jan. 19, 1977
[51] Int. Cl.² ............................................. F24J 3/02
[52] U.S. Cl. ............................... 126/271; 136/89 PC; 350/289; 350/299; 126/270
[58] Field of Search ................... 136/89 PC; 126/270, 126/271; 350/289, 293, 288, 298, 299

[56] References Cited
U.S. PATENT DOCUMENTS

| 2,969,788 | 1/1961 | Newton | 126/271 |
| 3,427,200 | 2/1969 | Lapin et al. | 136/89 PC |
| 3,923,381 | 12/1975 | Winston | 350/293 |
| 3,976,508 | 8/1976 | Mlavsky | 136/89 PC |
| 3,985,116 | 10/1976 | Kapany | 126/270 |
| 4,023,368 | 5/1977 | Kelly | 60/698 |

Primary Examiner—Aaron Weisstuch
Attorney, Agent, or Firm—Weingarten, Maxham & Schurgin

[57] ABSTRACT

A solar energy concentrator having an array of horns each having converging reflecting surfaces which provide a multiple reflective path from a relatively wide entrance aperture exposed to incident solar energy and a smaller exit aperture from which intensified energy emanates. The energy received from the exit apertures of the horn array is of higher density than the incident energy density and can be used as heat or converted to electrical or other form of energy for use.

3 Claims, 7 Drawing Figures

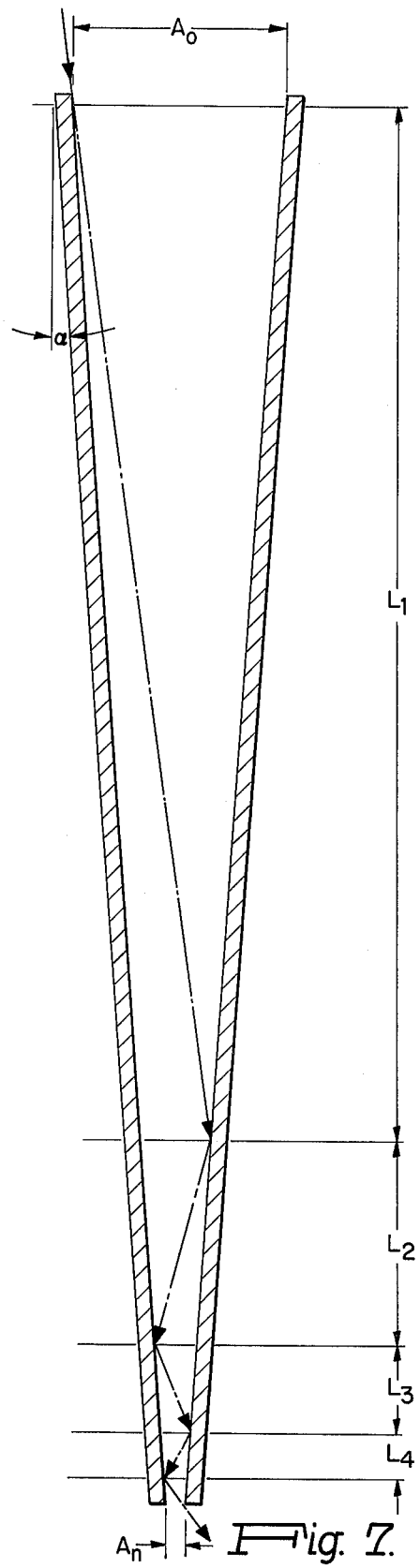
Fig. 7.
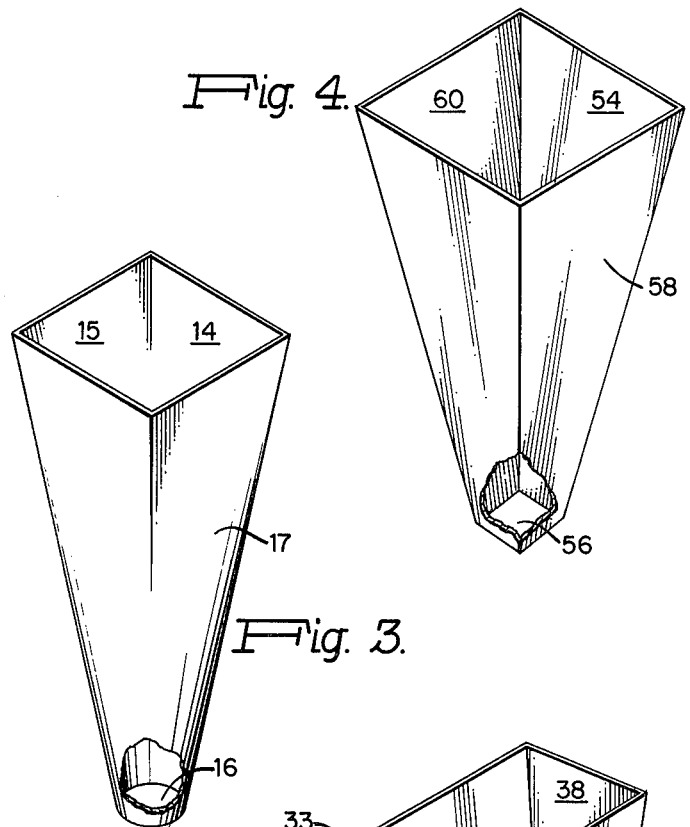
Fig. 4.
Fig. 3.
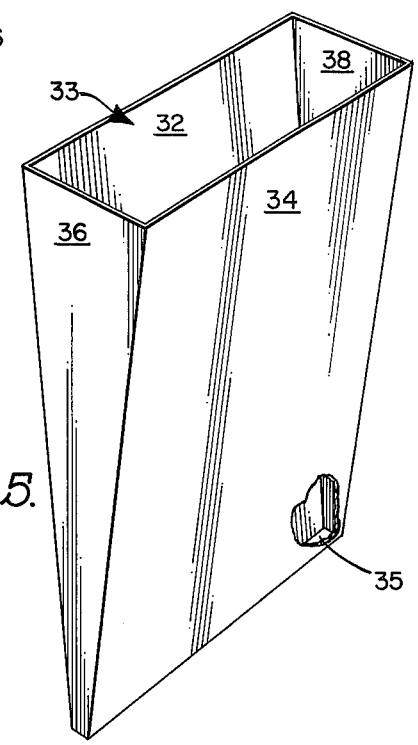
Fig. 5.

SOLAR ENERGY CONCENTRATOR

FIELD OF THE INVENTION

This invention relates to apparatus for the concentration of solar energy for use as a thermal source for heating or for conversion to another energy form.

BACKGROUND OF THE INVENTION

Many proposals have been made for the use of solar energy as a thermal source or for conversion to electricity. Among the various systems proposed are parabolic reflectors for concentrating energy at a focus at which a heat collector or other utilization device is disposed. Other known systems have employed arrays of reflectors or lenses for energy concentration. In general, systems proposed heretofore have not been wholly satisfactory, usually by reason of cost and complexity of the structures employed. For example, parabolic reflectors, in order to provide useful concentration, are relatively large and require a precise parabolic surface. In addition, the heat collector must be supported at the focus of the parabolic surface by a support structure which can partially occlude incident energy. Lens systems are by their nature expensive to construct and maintain. It would be useful to have a solar energy concentrator which can be easily constructed of relatively inexpensive materials and without necessity for sensitive and precisely constructed optical elements.

SUMMARY OF THE INVENTION

In brief, the present invention provides simple apparatus for concentration of solar energy for use as heat or for conversion to electricity or other form of energy. An array of horns is employed, each having converging reflecting surfaces which provide a multiple reflective path from a relatively wide entrance aperture exposed to incident solar energy and a smaller exit aperture from which intensified energy emanates. The array of horns can be of conical, pyramidal or other configuration having at least two confronting converging reflective surfaces. The horns are disposed along parallel axes having an entrance aperture in a plane generally perpendicular to incident energy. A thermal collector is disposed at the exit apertures of the horns for those applications requiring thermal energy. For generation of electricity, photosensors are disposed at the exit apertures for providing an electrical output in response to the concentrated solar energy received by such sensors. Various other apparatus can be provided at the exit apertures to employ or convert the concentrated energy to suit particular purposes.

DESCRIPTION OF THE DRAWINGS

The invention will be more fully understood from the following detailed description taken in conjunction with the accompanying drawings, in which:

FIG. 3 is a partially cutaway diagrammatic view of a horn employed in the embodiment of FIG. 1 and being of conical configuration having a pyramidal input end;

FIG. 4 is a partially cutaway diagrammatic view of an alternative horn construction of pyramidal form;

FIG. 5 is a partially cutaway diagrammatic view of an alternative horn configuration employed in the embodiment of FIG. 2;

FIG. 7 is a diagrammatic elevation view of a horn illustrating the multiple reflective path of received solar energy.

DETAILED DESCRIPTION OF THE INVENTION

Figure 1:
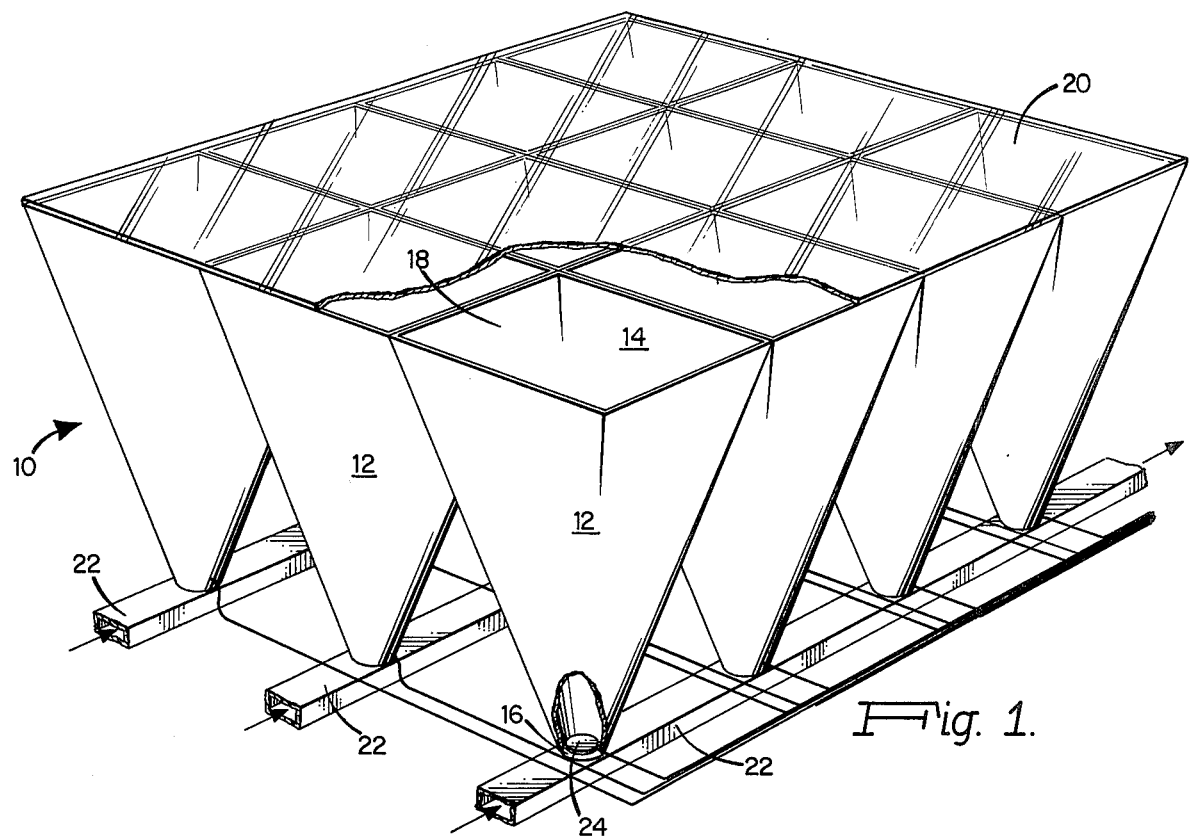
FIG. 1 is a partially cutaway pictorial view of a solar energy concentrator according to the invention.

Referring to FIG. 1 there is shown an array 10 of horns 12 disposed in a row and column arrangement extending along parallel axes. Each horn tapers from a receiving or entrance aperture 14 symmetrical about the horn axis to an exit aperture 16, also symmetrical about the horn axis. In the illustrated embodiment each horn is of conical configuration except for the portion near the entrance aperture which is of pyramidal configuration to permit adjacent horns of the array to be contiguously disposed along butting surfaces. The interior surface 18 of each horn 12 is coated with a reflective material to provide a continuous reflective surface and which provides a multiple reflective path for received solar energy. A transparent sheet 20 can be provided over the entrance apertures 14 of the array to prevent accumulation of dust or other debris within the horns 12 and to minimize degradation of the reflective properties of the surfaces 18.

In operation, the array 10 is disposed to be generally normal to incident solar energy and such energy entering the apertures 14 is multiply reflected by the reflective surfaces 18 and ultimately emerges from apertures 16 of the horns 12. Energy emanating from the exit apertures 16 is of greater density than the energy entering the entrance apertures 14, resulting in an energy concentration of appreciable magnitude. As will be further discussed below, the number of reflections experienced in a particular embodiment is dependent upon the flare angle of the horns 12 and the angle of incidence of received energy. Although some energy loss occurs for each reflection, sufficient energy can emergy from the exit apertures to be of substantially greater density then that of the input energy at the entrance apertures.

Energy emerging from the apertures 16 can be employed for its thermal content or can be converted to another form, typically to electricity. A thermal collector is illustrated in FIG. 1 in the form of ducts 22 disposed along respective rows of the array and having a surface abutting the exit apertures 16 of horns 12. A fluid is caused to flow in ducts 22 for removal or storage of the heat generated by the concentrated solar energy at the apertures 16. The specific manner and means of heat collection can take many different forms to suit particular requirements.

A photosensor 24 composed of one or more photosensitive elements can be disposed in the aperture 16 of a corresponding horn 12 for providing an electrical output in response to received solar energy. Such sensor can be employed in lieu of a thermal collector or in addition to a thermal collector for the same horn.

Figure 2:
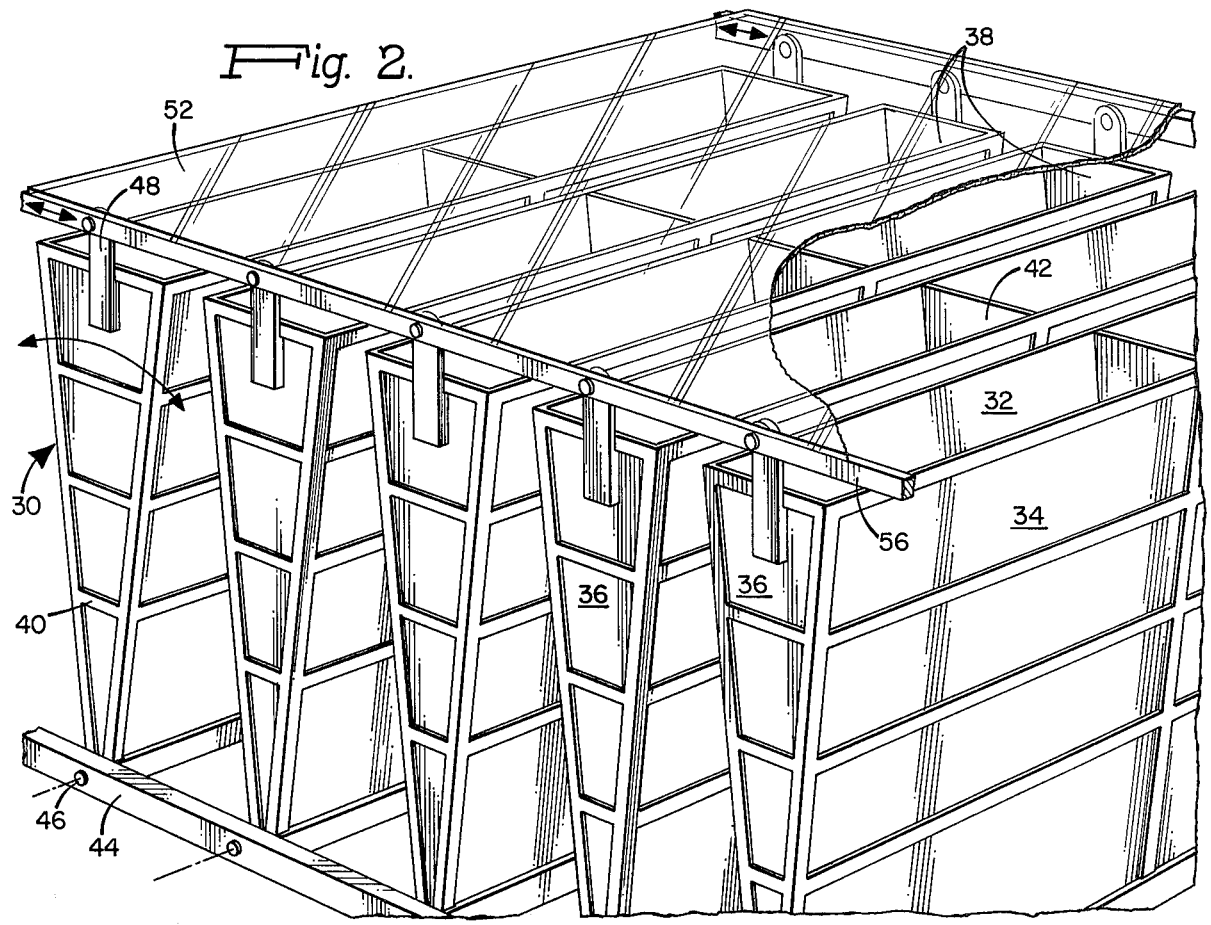
FIG. 2 is a partially cutaway pictorial view of an alternative embodiment of the invention employing a tiltable array of horns.

The array of horns can be movably supported to remain directed to the sun for normal incidence of energy into the array. An embodiment is shown in FIG. 2 which is tiltable to remain oriented approximately normal to received energy. A row of horns 30 is provided each having a pair of converging walls 32 and 34 and parallel side walls 36 and 38. Each horn 30 includes a supporting frame 40 for support of the walls 32, 34, 36 and 38, the inner surfaces of which are reflective. A central dividing wall 42 can be provided midway across the width of each horn 30 to provide additional support. Each horn 30 is pivotally mounted to a support frame 44 such as by axles 46 affixed to the narrower end of frames 40. The upper side portions of frames 40 include upstanding flanges 48 as shown. A bar 56 is pivotally connected to each of the flanges 48 along a respective side of horns 30. The horns are disposed along axes which are parallel to one another and which intersect the pivot points of the horns. It will be recognized that movement of bars 56 along their axes will cause rotation of the array of horns 30 as dipicted by the curved arrow in FIG. 2. The horn array can thus be inclined to be generally normal to received energy while the horns remain in parallel disposition. A transparent sheet 52 can be supported by bars 56 to provide a shield against debris entering the horns 30. A thermal collector can be provided at the exit apertures of horns 30 as can photosensors as described above.

The array illustrated in FIG. 2 is disposed with respect to the sun such that the sun will traverse the array along an axis extending across the width of the horns. The array is tiltable to account for the change in the angle of incidence caused by the changing inclination of the sun throughout the year. For example, the winter sunlight at New Orleans, Louisiana is at a minimum incidence of about 37° with respect to the horizontal, while the summer sun at New Orleans is at a maximum incidence of about 60°. The horn array is tilted accordingly to maintain substantially normal incidence of the sun's energy.

The horn employed in the embodiment of FIG. 1 is further illustrated in FIG. 3 and includes a square entrance aperture 14 having planar walls 15 which merge into a conical wall 17 which tapers toward exit aperture 16. The horn can alternatively be of wholly cylindrical configuration, although, when disposed in an array of like conical horns, spaces will exist between the adjacent circular entrance apertures through which received energy will pass and be lost. Thus the use of a rectangular or square entrance aperture as in FIGS. 1 and 3 is of benefit in increasing the efficient reception of incident energy. Another alternative horn configuration is shown in FIG. 4 in which the horn is of pyramidal form having a square entrance aperture 54 and a square exit aperture 56 joined by four flat walls 58, the inner surfaces 60 of which are reflective. A further alternative horn configuration is shown in FIG. 5 and is of the type employed in the embodiment of FIG. 2 having two tapered reflective surfaces provided on the inner surfaces of the tapering walls 32 and 34, with the side walls 36 and 38 being parallel to one another and with the entrance aperture 33 and exit aperture 35 being rectangular.

The horns can individually or as an array be fabricated by various well-known techniques, for example the horns can be molded of a plastic material with an aluminized or other reflective coating provided on the inner surfaces. An alternative construction can employ Mylar or other plastic sheet material having a mirrored surface and secured to an appropriate frame, as in the embodiment of FIG. 2.

Figure 6:
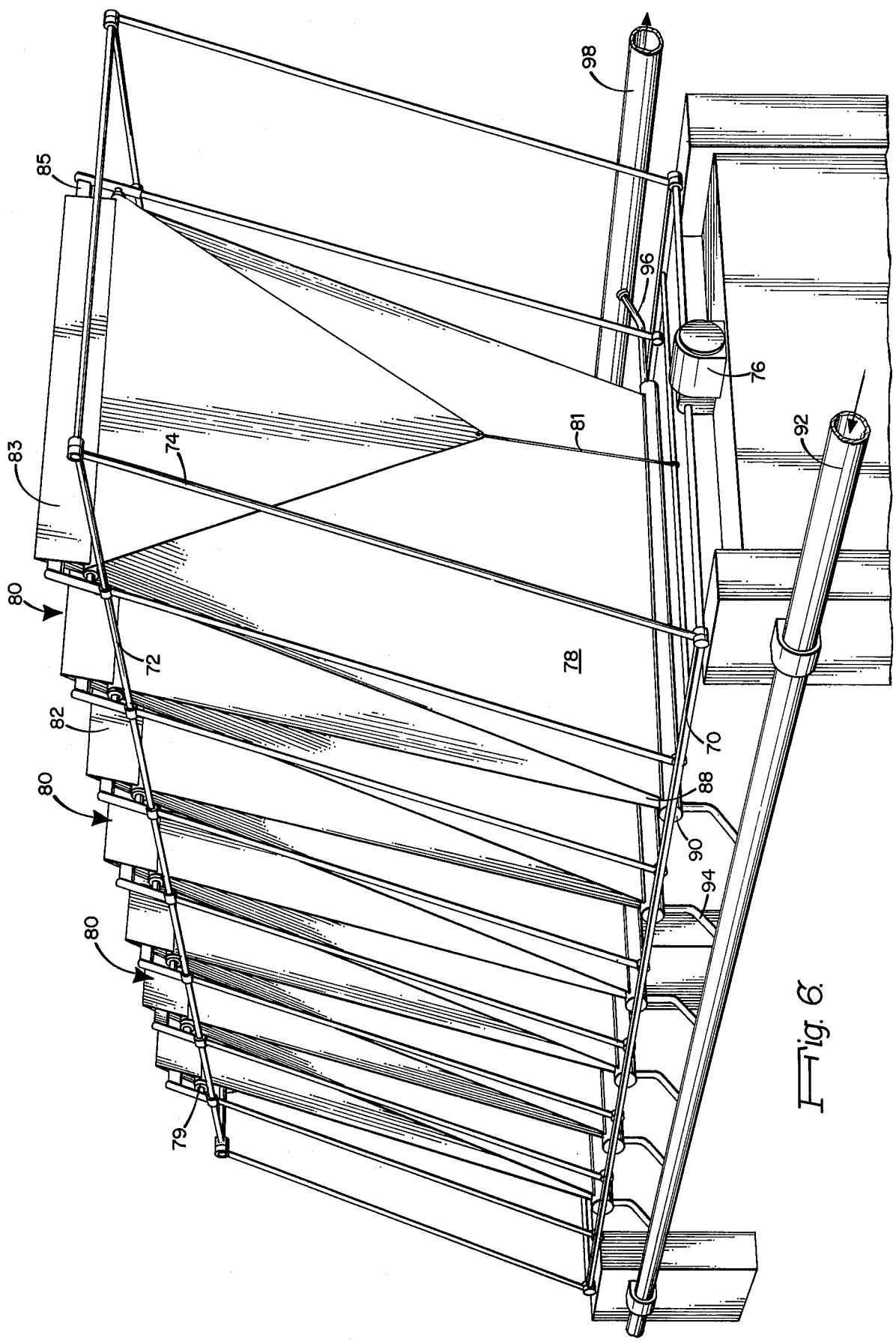
FIG. 6 is a partially cutaway pictorial view of a further embodiment of the invention.

A further embodiment of the invention is shown in FIG. 6 and which is similar to the embodiment of FIG. 2. Referring to FIG. 6, there is shown a frame composed of bottom members 70, top members 72 and side members 74, the side members being pivotally connected to the associated top and bottom members. A parallelogram linkage structure is thus formed which is tiltable such as by a motor 76 connected in any well-known manner to the linkage structure to cause forward or rearward tilting movement of the side members 74, with the top and bottom members remaining parallel. A sheet material 78 of Mylar or other suitable flexible material having a mirrored surface is disposed in a zigzag path between lower and upper members 70 and 72 to provide a linear array of horns 80. For each horn, a length of sheet material 78 is secured at one end to a pipe 90 and extends over an upper roller 79 and thence to an adjacent pipe 90 to which the opposite end of the sheet is attached. The end sheets are secured to the linkage structure as by a wire 81. The upper rollers 79 are rotatable about their axes and are upwardly spring-loaded to maintain the sheet material in a taut condition to provide the horns 80. In order to minimize shading of the edges of the entrance apertures 82 of horns 80, a sheet 83 of inverted V-shape is mounted by a support 85 above each roller 79. The sheet 83 has an outer mirrored surface and is approximately co-linear with the corresponding surfaces of sheet 78 forming the horns.

The pipes 90 are disposed along the exit apertures 88 of horns 80. The pipes 90 are coupled at one end to an intake manifold 92 by means of interconnecting tubing 94, and are connected at the opposite end via tubing 96 to an outlet manifold 98. Water or other suitable fluid is supplied from a source to intake manifold 92, the water then flowing through pipes 90 to become heated by the concentrated energy emanating from exit aperture 88, the heated water then flowing to the outlet manifold 98 for use.

The linkage structure is caused to tilt by means of motor 76 to cause forward or rearward tilting of horns 80 to maintain substantially normal incidence of the sun's energy. As with the array of FIG. 2, the array of FIG. 6 is disposed with respect to the sun such that the sun will traverse the array along the axis extending across the width of the horns. The peaked sheets 83 are movable with the link structure to remain aligned with the associated horns. During the movement of the link structure the sheet material 78 is caused to move over respective rollers 79, the spring-loaded rollers maintaining the sheet taut in order to maintain the intended horn configuration.

The multiple reflective path of received solar energy is shown schematically in FIG. 7. In this illustration, a light ray is normally incident to the entrance aperture $A_o$ and undergoes a first reflection from the reflective surface at the entrance aperture and then experiences four further reflections, after the last of which the beam travels out of the exit aperture $A_n$ for collection. The energy concentration is a function of the ratio of the entrance to exit apertures, the number of reflections experienced between the apertures and the efficiency of the reflective surface. The length and aperture size can be computed by the following formulas.

$$L_n = \frac{A_{(n-1)} \sin(90-\alpha) \cos 2n\alpha}{\sin(2n+1)\alpha}$$

$$A_n = \left[ \frac{A_{(n-1)} \sin(90-\alpha) \sin 2n\alpha}{\sin(2n+1)\alpha} \right] -$$

-continued $$\left[ \frac{A_{(n-1)} \sin(90-\alpha) \cos 2n\alpha \tan\alpha}{\sin(2n+1)\alpha} \right]$$

where $n$ is the number of reflections, $\alpha$ is the flare angle of the horn reflecting surface, $L_n$ is the length of the horn from the entrance aperture to the point of the nth reflection, $A_n$ is the width or diameter of the horn exit aperture at the point of the nth reflection.

It will be appreciated that modifications and alternative implementations will occur to those versed in the art without departing from the spirit or true scope of this invention. Accordingly, it is not intended to limit the invention by what has been particularly shown and described except as indicated in the appended claims.

What is claimed is:

1. A solar energy concentrator comprising:
   a parallelogram linkage structure composed of top, bottom and side members and tiltable to cause forward and rearward tilting movement of the side members, with the top and bottom members remaining parallel over the range of tilting movement;
   a flexible continuous sheet material having a reflective surface disposed in a zig-zag path between the lower and upper members of said linkage structure to provide a linear array of horns;
   means for securing said sheet material to said linkage structure to maintain said sheet in a taut condition throughout the range of tilting movement of said linkage structure;
   each of said horns including two planar converging, confronting surfaces reflective to incident solar energy, each horn extending between an entrance aperture at the top of said linkage structure and symmetrical about the horn axis, and a smaller exit aperture at the bottom of said linkage structure and symmetrical about the horn axis to provide a multiple reflective path for incident solar energy, the horn axes of said array of horns being parallel, the entrance apertures of said horns lying in a plane generally perpendicular to the horn axes;
   means coupled to said linkage structure and operative to tilt said structure to cause pivoting in unison of said array of horns to dispose said array at an intended angular relation to incident solar energy; and
   means at the exit aperture of each of said horns to receive concentrated solar energy therefrom.

2. A solar energy concentrator according to claim 1 and including:
   a plurality of elongated members each of inverted V-shape and each mounted at the top of said linkage structure with the outer surfaces approximately colinear with the corresponding surfaces of said sheet material forming the array of horns, the outer surfaces of each member being reflective and operative to minimize shading of the edges of the entrance apertures of said horns.

3. A solar energy concentrator according to claim 1 including a plurality of rollers extending across the top of said parallelogram linkage structure and over which said sheet material is disposed.

* * * * *